US005723515A

United States Patent [19]

Gottfried

[11] Patent Number: 5,723,515
[45] Date of Patent: Mar. 3, 1998

[54] INTUMESCENT FIRE-RETARDANT COMPOSITION FOR HIGH TEMPERATURE AND LONG DURATION PROTECTION

[75] Inventor: Samuel Gottfried, Riverdale, N.Y.

[73] Assignee: No Fire Technologies, Inc., Upper Saddle River, N.J.

[21] Appl. No.: 581,449

[22] Filed: Dec. 29, 1995

[51] Int. Cl.⁶ .................................................. C09K 21/14
[52] U.S. Cl. ........................................ 523/179; 428/921
[58] Field of Search .............................. 428/921; 523/179

[56] References Cited

U.S. PATENT DOCUMENTS

| | | | |
|---|---|---|---|
| 4,380,593 | 4/1983 | von Bonin et al. | 521/163 |
| 4,740,527 | 4/1988 | von Bonin | 521/105 |
| 4,879,320 | 11/1989 | Hastings | 523/179 |
| 4,965,296 | 10/1990 | Hastings | 523/179 |
| 5,401,793 | 3/1995 | Kobayashi et al. | 524/401 |

*Primary Examiner*—Helen Lee
*Attorney, Agent, or Firm*—Ezra Sutton

[57] ABSTRACT

A fire-retardant coating material including a fluid intumescent base material having a foaming agent, a blowing agent, a charring agent, a binding agent, a solvent, and a pigment. The coating material further includes a flame spread reduction agent; refractor fibers dispersed in the fluid intumescent base material; an oxidation reduction agent; a thermal transmission reduction agent; a stabilizer and volatile organic reduction component; a mechanical enhancer component for physical impact resistance and adhesion; a water-resistance agent; and an elasticity agent to increase resistance to cracking and shrinking, and to improve ease of spraying.

34 Claims, No Drawings

INTUMESCENT FIRE-RETARDANT COMPOSITION FOR HIGH TEMPERATURE AND LONG DURATION PROTECTION

FIELD OF THE INVENTION

The present invention relates to a fire-retardant coating that is applied to many organic and inorganic substrates to provide fire protection by reducing the flame spread and reducing the heat transmission. More particularly, the new and improved fire-retardant coating composition is designed for use in severe applications for protection of the substrate where there is exposure to high temperatures or to fire for long duration or to substrates like plastics and composites with relatively low melting or ignition temperatures.

BACKGROUND OF THE INVENTION

Intumescent materials have been known for many years and have been used as coatings to provide thermal protection up to approximately 2,000° F. Substrates, such as wood, various metals, such as steel, aluminum, etc., and various types of plastics, such as PVC, thermoplastics, and epoxies, have been coated to make them more fire-retardant.

However, an intumescent coating applied to these aforementioned substrates is impractical where the coating is subjected to severe physical and environmental conditions. In addition, with the increased use of wood and wood by-products and the proliferation of new types of wood composites for use in home and office construction applications, and composites of plastics and other organic materials, current intumescent fire-retardant coating compositions do not provide adequate protection from fire and heat for a prolonged time period. Currently, there is no single intumescent fire-retardant coating material having all of the following features:

1. Reduction of available oxygen in confined areas, such as a room, to smother the fire and to retard the fire in the advent of a flashover;
2. Providing a low rate of thermal transmission for coatings to protect various substrates, especially where low weight and low cost are critical, such as in aircraft and ships.
3. Providing an effective intumescent fire-retardant coating for low density wood by-products, composite wood and plastic materials which require zero flame spread for prolonged time exposure during a fire.
4. Sufficient mechanical properties and durability, to resist abrasion, impact and severe weather.
5. Non-toxic before it is exposed to heat, and the combustion products emitted upon exposure to heat, are below the gas level emissions required by today's transportation standards.

Also, in many applications of an intumescent fire-retardant coating to substrates such as wood, PVC, thermoplastics, aluminum and epoxies, coatings are impractical for reasons other than fire protection, as they lack abrasion resistance, impact resistance, water resistance, and resistance to other environmental factors. Because of these factors, present coatings do not provide protection from fire and heat for a sufficient time duration during a fire, and are not durable enough to last sufficiently long to make them cost effective.

There is a need for a new and improved intumescent fire-retardant coating material that would provide substantial protection from fire and heat for a long duration if a fire were to occur. The coating material should be useable on a variety of substrates such as iron, steel, stainless steel, aluminum, and other non-ferrous metals, wood, plywood, particle board, and other wood by-products, plastics, PVC, thermoplastics, epoxies, and composites.

DESCRIPTION OF THE PRIOR ART

Intumescent fire-retardant coating materials of various compositions for use on a variety of substrates have been disclosed in the prior art. For example, U.S. Pat. Nos. 4,380,593; 4,740,527; 4,879,320; 4,965,296; and 5,401,793 all disclose intumescent coating materials of different chemical compositions for use on a variety of material substrates. None of the prior art patents disclose the chemical composition of the present invention.

Accordingly, it is an object of the present invention to provide an intumescent fire-retardant coating composition that is effective at continuously maintained temperatures as high as 2500° F. for a long duration under severe environmental conditions, with reduced degradation of the mechanical properties of the original material being coated.

Another object of the present invention is to provide a thin, light-weight, intumescent fire-retardant coating for a substrate which provides a low thermal transmission rate.

Another object of the present invention is to provide an intumescent fire-retardant coating composition which reduces the available oxygen ($O_2$) in confined areas, to decrease the burning time and to retard the advent of flashover during a fire or explosion.

Another object of the present invention is to provide an intumescent fire-retardant coating composition for a variety of low density wood products and composite wood products requiring zero flame spread during a prolonged exposure to fire.

Another object of the present invention is to provide an intumescent fire-retardant coating composition which during a fire will not give-off harmful vapors into the environment.

Another object of the present invention is to provide an intumescent fire-retardant coating composition that improves adhesion to a substrate and resistance to abrasion and impact.

Another object of the present invention is to provide an intumescent fire-retardant coating composition that is water resistant and which reduces the hygroscopic aspect of the coating material.

Another object of the present invention is to provide an intumescent fire-retardant coating composition that reduces hygroscopicity within the coating material such that the coating material on a given substrate has an improved and greater lifetime, and a higher performance when a fire occurs.

Another object of the present invention is to provide an intumescent fire-retardant coating composition that is suitable for a variety of substrate materials such as iron, steel, stainless-steel, aluminum, and other non-ferrous metals, wood, plywood, chip-board, particle board, plastics, PVC, thermoplastics, epoxies, neoprene, rubber, and composites.

Another object of the present invention is to provide an intumescent fire-retardant coating composition that has application for use in many industries such as construction, transportation, telecommunications, utilities, marine, chemical, petroleum, manufacturing, and military applications.

Another object of the present invention is to provide an intumescent fire-retardant coating composition that when applied to coat a substrate is able to resist corrosion due to chemicals, corrosive vapors, water, and salt-water; and in addition resist physical impact, high pressure, and/or mechanical vibrations without the coating material delaminating itself from the substrate.

Another object of the present invention is to provide an intumescent fire-retardant coating composition that includes a novel combination of an intumescent base material, a flame spread reduction agent, an oxygen reduction agent, a thermal transmission reduction agent, refractory fibers, a stabilizer, a volatile organic (VOC) reduction component, a mechanical enhancer component for physical impact resistance and adhesion to a substrate, a water-resistance agent and an elasticity agent.

Another object of the present invention is to provide an intumescent fire-retardant coating composition that includes an elasticity agent which allows for substrate durability, and allows for application of thicker coatings of intumescent film on a substrate with little or no mud cracking.

Another object of the present invention is to provide an intumescent fire-retardant coating composition which allows the aforementioned new additives within the coating composition not to effect or degrade the overall thermal performance of the main intumescent base material.

A further object of the present invention is to provide an intumescent fire-retardant coating composition which can be easily applied and mass produced in an automated and economical manner and is cost efficient for a variety of applications by the user.

SUMMARY OF THE INVENTION

In accordance with the present invention, there is provided an intumescent fire-retardant coating material that includes an intumescent base material, a flame spread reduction agent, an oxygen reduction agent, a thermal transmission reduction agent, refractory fibers dispersed therein, a stabilizer, a volatile organic reduction component, a mechanical enhancer component for physical impact resistance and adhesion, a water-resistance agent and an elasticity agent to increase resistance to cracking and shrinking. This coating material can be used on most substrates and in severe climatic and environmental conditions where heat, cold, and humidity play an important factor in the fire-retardant standards for the structures involved including houses and to the interior and exterior of homes, roofs, factories, commercial buildings, airplanes, vehicles, ships, boats, sailboats, and the like. A top coat such as coal tar or polyurethane is required over the coating material of the present invention when used in said severe climatic conditions or when used in underwater applications. Other uses for this fire-retardant coating material include application to marine bulkheads; and cabins, floors, etc; airport loading bridges; off-shore oil drilling rigs; cable and conduit wraps; storage tanks; file cabinets and safes; firewall barriers for vehicles, buses, trucks, etc.

The intumescent fire-retardant coating composition of this invention is suitable for a variety of material substrates such as iron, steel, stainless-steel, aluminum, non-ferrous metals, wood, ply-wood, chip-board, particle board, composite board, plastics, PVC, thermoplastics, epoxies, neoprene, rubber, and the like.

DETAILED DESCRIPTION OF THE PREFERRED EMBODIMENT

In the present invention, the preferred embodiment of the intumescent fire-retardant coating composition includes the following:

| Component Compound | Range (By Weight) |
| --- | --- |
| Intumescent base material including a foaming agent, a blowing agent, a charring agent, a binding agent, a solvent and a pigment. | 20% to 60% |
| Flame spread reduction agents such as ammonium orthophosphate, aluminum trihydrate ($AL_2O_3 \cdot 3H_2O$), zinc oxide (ZnO), zinc borate ($3ZnO \cdot 2B_2O_3$), sodium silicate ($Na_2SiO_3$), calcium silicate ($Ca_2SiO_4$), antimony oxide, zinc metaphosphate, and potassium metaphosphate. | 2% to 12% |
| Oxygen reduction agents such as urea ($CON_2H_4$), urea formaldehyde, dicyandiamide and melamine. | 1% to 5% |
| Thermal transmission reduction agents such as zirconium dioxide ($ZrO_2$), chromium oxide (CrO), yttrium oxide ($Y_2O_3$), and potassium oxide ($K_2O$). | 2% to 6% |
| Refractory fibers such as aluminum oxide ($AL_2O_3$), silicon dioxide ($SiO_2$), ferric oxide ($Fe_2O_3$), sodium oxide ($Na_2O$), zirconium oxide ($ZrO_2$) beryllium oxide (BeO), manganese oxide (MNO), zinc oxide (ZnO), titanium oxide ($TiO_2$) and tantalum oxide ($TaO_2$). | 8% to 18% |
| Stabilizer and volatile organic (VOC) reduction components such as erythritol and paraffin. | 6% to 12% |
| Mechanical enhancer components for physical impact resistance and adhesion to a substrate such as calcium carbonate ($CaCO_3$), ceramic oxides, calcium silicate, sodium silicate. | 1% to 4% |
| Water-resistance agents and efflorescence reduction agents such as carboxymethyl cellulose, ethyl hydroxyethyl cellulose ammonium polyphosphate ($NH_4H_2PO_4$), melamine-formaldehyde coatings, and other low solubility coatings and acrylics, silicones, diethylene glycol, and monoethyletheracetate. | 4% to 8% |
| Elasticity agents to increase resistance to cracking and shrinking; and to improve ease of spraying; such as vermiculite, perlite elastomerics, and acrylics. | 0% to 20% |

As stated above, the fluid intumescent base material of the preferred embodiment includes a foaming agent, a blowing agent, a charring agent, a binding agent, a solvent and a pigment. The foaming agent can be chemical compounds or coated compounds that have a low water solubility such as ammonium phosphate or potassium tripolyphosphate. The blowing agent can be compounds such as melamine, urea, dicyandiamide, guanidine, or glycine. The charring agent can be compounds such as dipentaerythritol (DPE), chlorinated paraffin, pentaerythritol, polyurethane, resorcinol, inositol, polyalcohols, sorbitol, or dextrin. The binding agent can be compounds such as calcium carbonate or butoxyethoxy ethanol. The solvent can be water, oil, toluene, or propylene glycol. The pigment can be compounds such as titanium oxide, lamp black or oxalates.

EXAMPLES OF USE FOR THE INTUMESCENT FIRE-RETARDANT COATING MATERIAL

Example 1

Five gallons of the intumescent material of the invention is mixed with 1.5 lbs. of aluminum trihydrate, 2.2 lbs. of milled refractory fibers, and 1.2 lbs. of ammonium polyphosphate. The composition is applied to T1-11 siding comprising three walls of a room, in compliance with the specifications of the Uniform Building Code (UBC) 42-2.

The coating is applied to a thickness of 0.012 inches. The test is conducted according to UBC 42-2, with a 40 kw corner exposure for five minutes, and a 150 kw corner exposure for ten additional minutes. The maximum instantaneous increase in Radiant Heat Release (above the applied heat) is less than 20 kw.

Example 2

A composition identical to the one used in Example 1 is applied to three walls composed of cedar shakes, and installed in a room similar to Example 1. A soffett and facia section is installed, similar to the construction of a typical exterior of a residence. The coating is applied to a thickness of 0.012 inches, and top coated with a general exterior grade acrylic latex paint, suitable for house painting. The entire system is exposed to the fire and heat conditions of UBC 42-2, as in Example 1. The maximum instantaneous increase in Radiant Heat Release is less than 50 kw.

Example 3

A composition identical to the one used in Example 1 is applied to the surface of ⅝ inch thick medium density (approximately 40 lbs./cu.ft.) particle board to a thickness of 0.012 inches. A propane torch, rated at 2000 BTU/hour and having a flame temperature exceeding 2100° F., is used to heat the surface. After thirty minutes, the rear surface temperature of the particle board is less than 300° F.

Example 4

Five gallons of the intumescent material of the invention is mixed with 1.8 lbs. of aluminum trihydrate, 3.5 lbs. of milled refractory fibers, 2.8 lbs. of perlite, and 1.6 lbs. of vermiculite. The composition is applied to a 30 inch section of W10×49 steel column to a thickness of 0.060 inches. The column is fire tested in an oven configuration, and according to the specifications of Underwriters Laboratories Canada (ULC) S101. The average column temperature does not exceed the maximum average allowable temperature for in excess of 100 minutes.

Example 5

A composition identical to the one used in Example 1 is applied to the surface of a 12"×24" sheet of type 6061 0.040 inch thick aluminum, at a coating thickness of 0.008 inches. The sample is tested with a propane burner, which exceeds the temperature and heat requirements of F.A.R. 25,855 Appendix F Part III. The aluminum does not warp, discolor or burn through for in excess of fifteen minutes, far exceeding the requirements of the F.A.R. standard.

Example 6

A composition identical to the one used in Example 1 is used to coat the outer jacket of five typical communication cables with varying diameters and jacket materials. The diameter of the cables varies from 0.5 inches to 2.0 inches. The jacket materials are various standard materials used for communications cables. The coating is two coats, or approximately 0.010 inches. The cables are tested in an oven configuration similar to the requirements of IEEE 383. The external cable temperatures of the small diameter cables do not exceed 200° F. after 90 minutes. The temperatures of the large diameter cables do not exceed 125° F. after 90 minutes.

Example 7

A composition identical to the one used in Example 1 is applied to a section of a plastic automobile gas tank. The sample is approximately six inches square, and coated with 0.010 inches of the composition. The sample is exposed to a 2000 BTU/Hour torch at a temperature of 1600° F. for seven minutes. The maximum reverse surface temperature is less than 300° F. after five minutes, and less than 420° F. after seven minutes.

Example 8

A composition identical to the one used in Example 4 is used to coat a 6×6×⅛ inch section of cold rolled steel, at a thickness of 0.018 inches. The rear surface of the steel plate is insulated. The front surface is exposed to a 2000 BTU/Hour torch at 2100° F. for five minutes. The rear surface temperature of the steel plate is less than 450° F. after five minutes.

Example 9

A composition identical to the one used in Example 1 is applied to one surface of a door core, made of 1⅝ inch thick, 34 lbs/cu.ft density particle board. The coating thickness is 0.008 inches. The coated door core is tested in an oven similar to the requirements of ASTM E152. After 60 minutes, the temperature of the rear of the door does not exceed 210° F. anywhere on the door.

Example 10

A composition identical to the one used in Example 1 is applied to one surface of Auratone ceiling tiles manufactured by U.S. Gypsum. The coating thickness is 0.002 inches. The ceiling tiles are installed in a ceiling grid assembly in a full scale room furnace, and tested according to the requirements of FC 708. The ceiling grid did not reach thermal transmission failure for 125 minutes. The ceiling tile did not fall out of the assembly for in excess of 180 minutes.

Application and Uses for the Present Invention

The intumescent fire-retardant coating material of the present invention can be used with a top coat, such as coal tar, in severe climatic and environmental conditions where heat, cold, humidity, and corrosion play an important factor in the fire-retardant standards for the structure, object, or product being coated. For example, a severe climatic and environmental application for the present invention would be oil-drilling rigs located in the Northern Atlantic Ocean. These rigs are constructed of steel and are subject to cold, salt-water and chemical corrosion, and temperature fluctuations. The coating material of the present invention would be sprayed or painted on the steel foundation and steel plant structures and then have a protective top coat applied, such as coal tar. This coating material bonds with the steel prior to placing of the rigs in the ocean, and in use the coating material will not delaminate itself from the steel structures of the rigs. This makes these oil rigs less susceptible to fire damage in case of an oil explosion or fire.

Another more typical application would be the coating of wood, wood by-products, composite board, particle board, ply-wood, etc. for construction. The coating material can be applied to exterior siding, interior structures, roofing, garages, ceilings, penetration barriers, PVC wrappings and the like. The coating material also has application for residential dwellings, hotels and public accommodations, such that the coating material can be applied to wallpaper, ceiling tiles, kitchen cabinets, kitchen hoods, carpet backing, room walls, doors, file cabinets, safes, doors, PVC wrappings, wall barriers and the like.

Another example of a typical application would be the coating of structural steel, columns, beams, steel decking, bar joists, hung ceilings for construction of commercial buildings, high-rise office buildings, high rise apartment complexes, bridges, tunnels, and the like.

A further example of application would be the transportation industry where the fire-retardant coating material would be used in autos, buses, trucks, cargo ships, and airplanes; for coating of vehicular undercarriages, exhaust systems, gas tanks, fire walls, engine compartments, catalytic converters, hoods, cargo liner patches, airport loading bridges, and the like.

Still another example of application would be in the marine industry where the coating material would be used on bulkheads, piers, cabinet penetration barriers, cables, conduits, cargo areas, and offshore drilling platforms.

A still further example of application would be in the telecommunications, utilities, petroleum, and chemical industries where the coating material would be used on cable wrap and coating, conduit wrap, communication towers, fire penetration barriers, seals, pipeline wraps, storage tanks, reactors, ovens, distillation columns, furnaces, and the like.

Advantages of the Present Invention

Accordingly, an advantage of the present invention is that it provides for an intumescent fire-retardant coating composition that is effective at continuously maintained temperatures as high as 2500° F. for a long duration under severe environmental conditions, with reduced degradation of the mechanical properties of the original material being coated.

Another advantage of the present invention is that it provides a thin intumescent fire-retardant coating for a substrate which provides for a low thermal transmission rate.

Another advantage of the present invention is that it provides for an intumescent fire-retardant coating composition which reduces the available oxygen ($O_2$) in confined areas, to decrease the burning time and to retard the advent of flashover during a fire or explosion.

Another advantage of the present invention is that it provides for an intumescent fire-retardant coating composition for a variety of low density wood products and composite wood products requiring zero flame spread during a prolonged exposure to fire.

Another advantage of the present invention is that it provides for an intumescent fire-retardant coating composition which during a fire will not give-off vapors harmful to occupants.

Another advantage of the present invention is that it provides for an intumescent fire-retardant coating composition that improves adhesion to many surfaces and resistance to abrasion and impact.

Another advantage of the present invention is that it provides for an intumescent fire-retardant coating composition that is water resistant which reduces the hygroscopic aspect of the coating material.

Another advantage of the present invention is that it provides for an intumescent fire-retardant coating composition that reduces hygroscopicity within the coating material such that the coating material on a given substrate has an improved and greater lifetime, and a higher performance when a fire occurs.

Another advantage of the present invention is that it provides for an intumescent fire-retardant coating composition that is suitable for a variety of material substrates such as iron, steel, stainless-steel, aluminum, and non-ferrous metals, wood, plywood, chip-board, particle board, plastics, PVC, thermoplastics, epoxies, neoprene, rubber, and the like.

Another advantage of the present invention is that it provides for an intumescent fire-retardant coating composition that has application for use in many industries such as construction, transportation, telecommunications, utilities, marine, chemical, petroleum, manufacturing, and military applications. Another advantage of the present invention is that it provides for an intumescent fire-retardant coating composition that when applied to a substrate is able to resist corrosion due to chemicals, corrosive vapors, water, and salt-water; and in addition resist physical impact, high pressure, and/or mechanical vibrations without the coating material delaminating itself from the substrate.

Another advantage of the present invention is that it provides for an intumescent fire-retardant coating composition that includes a novel combination of an intumescent base material, a flame spread reduction agent, an oxygen reduction agent, a thermal transmission reduction agent, refractory fibers, a stabilizer, a volatile organic (VOC) reduction component, a mechanical enhancer component for physical impact resistance and adhesion to a substrate, a water-resistance agent and an elasticity agent.

Another advantage of the present invention is that it provides for an intumescent fire-retardant coating composition that includes an elasticity agent which allows for substrate durability, and allows for application of thicker coatings of intumescent film on a substrate with little or no mud cracking.

Another advantage of the present invention is that it provides for an intumescent fire-retardant coating composition which allows the aforementioned new additives within the coating composition not to effect or degrade the overall thermal performance of the main intumescent base material.

A further advantage of the present invention is that it provides for an intumescent fire-retardant coating composition which can be easily applied, and mass produced in an automated and economical manner and is cost efficient for a variety of applications by the user.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A fire-retardant coating material, comprising:
   a) a fluid intumescent base material having a foaming agent, a blowing agent, a charring agent, a binding agent, a solvent, and a pigment;
   b) a flame spread reduction agent;
   c) refractory fibers dispersed in said fluid intumescent base material;
   d) an oxygen reduction agent;
   e) a thermal transmission reduction agent;
   f) a stabilizer and volatile organic reduction component;
   g) a mechanical enhancer component for physical impact resistance and adhesion to a substrate;
   h) a water-resistance agent; and
   i) an elasticity agent to increase resistance to cracking and shrinking, and to improve ease of spraying.

2. A fire-retardant material in accordance with claim 1, wherein said foaming agent of said fluid intumescent base material is ammonium phosphate or potassium tripolyphosphate.

3. A fire-retardant material in accordance with claim 1, wherein said blowing agent of said fluid intumescent base material is melamine, urea, dicyandiamide, guanidine or glycine.

4. A fire-retardant material in accordance with claim 1, wherein said charring agent of said fluid intumescent base material is dipentaerythritol (DPE), chlorinated paraffin, alcohol, polyols, pentaerythritol (PE), polyurethane, resorcinol, inositol, polyalcohols, sorbitol, or dextrin.

5. A fire-retardant material in accordance with claim 1, wherein said binding agent of said fluid intumescent base material is calcium carbonate or butoxyethoxy ethanol.

6. A fire-retardant material in accordance with claim 1, wherein said solvent of said fluid intumescent base material is water, oil, toluene, or propylene glycol.

7. A fire-retardant material in accordance with claim 1, wherein said pigment of said fluid intumescent base material is titanium oxide, lamp black, or oxalates.

8. A fire-retardant material in accordance with claim 1, wherein said fluid intumescent base material includes titanium dioxide, ammonium orthophosphate, melamine, dipentaerythritol (DPE), calcium carbonate, vinyl acetate, acrylic resin, and propylene glycol.

9. A fire-retardant material in accordance with claim 1, wherein said flame spread reduction agent is aluminum trihydrate, ammonium orthophosphate, zinc oxide, zinc borate, sodium silicate, calcium silicate, antimony oxide, zinc metaphosphate, or potassium metaphosphate.

10. A fire-retardant material in accordance with claim 1, wherein said refractory fibers consist of aluminum oxide and/or silicon dioxide.

11. A fire-retardant material in accordance with claim 1, wherein said refractory fibers consist of aluminum oxide and/or silicon dioxide, in combination with at least one or more of sodium oxide, ferric oxide, zirconium oxide, beryllium oxide, manganese oxide, zinc oxide, titanium oxide and tantalum oxide.

12. A fire-retardant material in accordance with claim 1, wherein said refractory fibers are milled fibers.

13. A fire-retardant material in accordance with claim 1, wherein said oxygen reduction agent is urea, urea formaldehyde, or dicyandiamide.

14. A fire-retardant material in accordance with claim 1, wherein said thermal transmission reduction agent is zirconium oxide, chromium oxide, yttrium oxide, or potassium oxide.

15. A fire-retardant material in accordance with claim 1, wherein said stabilizer and volatile organic reduction component is erythritol or paraffin.

16. A fire-retardant material in accordance with claim 1, wherein said mechanical enhancer component is calcium carbonate, ceramic oxides, calcium silicate, sodium silicate, or dibutylphthalate.

17. A fire-retardant material in accordance with claim 1, wherein said water-resistance agent is ethyl hydroxy ethyl cellulose, carboxymethyl cellulose, ammonium polyphosphate, melamine-formaldehyde coating, acrylics, silicones, diethylene glycol, or monoethyletheracetate.

18. A fire-retardant material in accordance with claim 1, wherein said elasticity agent is vermiculite, perlite, elastomerics, or acrylics.

19. A fire-retardant material in accordance with claim 1, wherein said fluid intumescent base material is in the range of 20% to 60% by Weight.

20. A fire-retardant material in accordance with claim 1, wherein said flame spread reduction agent is in the range of 2% to 12% by weight.

21. A fire-retardant material in accordance with claim 1, wherein said refractory fibers are in the preferred range of 4 ounces to 28 ounces for each gallon of intumescent material.

22. A fire-retardant material in accordance with claim 1, wherein said refractory fibers are in the general range of 1 ounce to 20 ounces for each gallon of intumescent material.

23. A fire-retardant material in accordance with claim 1, wherein said refractory fibers are in the range of 8% to 18% by weight.

24. A fire-retardant material in accordance with claim 1, wherein said oxidation reduction agent is in the range of 1% to 5% by weight.

25. A fire-retardant material in accordance with claim 1, wherein said thermal transmission reduction agent is in the range of 2% to 6% by weight.

26. A fire-retardant material in accordance with claim 1, wherein said stabilizer and volatile organic reduction component is in the range of 6% to 12% by weight.

27. A fire-retardant material in accordance with claim 1, wherein said mechanical enhancer component is in the range of 1% to 4% by weight.

28. A fire-retardant material in accordance with claim 1, wherein said water-resistance agent is in the range of 4% to 8% by weight.

29. A fire-retardant material in accordance with claim 1, wherein said elasticity agent is in the range of 0% to 20% by weight.

30. A fire-retardant material in accordance with claim 1, wherein said fire-retardant material is applied to a substrate being iron, steel, stainless-steel, aluminum, non-ferrous metals, wood, plywood, chip-board, particle board, orientation strand board, composite board, plastics, PVC, thermoplastics, epoxies, neoprene, or rubber.

31. A fire-retardant coating material, comprising:
a) a fluid intumescent base material having a foaming agent, a blowing agent, and a charring agent;
b) a flame spread reduction agent;
c) refractory fibers dispersed in said fluid intumescent base material;
d) an oxygen reduction agent; and
e) a thermal transmission reduction agent.

32. A fire-retardant material in accordance with claim 31, wherein said flame spread reduction agent is aluminum trihydrate, zinc oxide, or zinc borate.

33. A fire-retardant material in accordance with claim 31, wherein said oxygen reduction agent is urea.

34. A fire-retardant material in accordance with claim 31, wherein said thermal transmission reduction agent is zirconium oxide, chromium oxide, yttrium oxide, or potassium oxide.

* * * * *